(12) United States Patent
Vleugels et al.

(10) Patent No.: US 9,264,991 B1
(45) Date of Patent: *Feb. 16, 2016

(54) APPARATUS AND METHOD FOR INTEGRATING SHORT-RANGE WIRELESS PERSONAL AREA NETWORKS FOR A WIRELESS LOCAL AREA NETWORK INFRASTRUCTURE

(71) Applicant: Omega Sub Holdings, Inc., Scottsdale, AZ (US)

(72) Inventors: Katelijn Vleugels, Palo Alto, CA (US); Roel Peeters, Palo Alto, CA (US)

(73) Assignee: Omega Sub Holdings, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/073,260

(22) Filed: Nov. 6, 2013

Related U.S. Application Data

(60) Continuation of application No. 13/560,917, filed on Jul. 27, 2012, now Pat. No. 8,599,814, which is a continuation of application No. 12/892,825, filed on Sep. 28, 2010, which is a division of application No.

(Continued)

(51) Int. Cl.
*H04W 52/02* (2009.01)
*H04W 84/10* (2009.01)
(Continued)

(52) U.S. Cl.
CPC .......... *H04W 52/0212* (2013.01); *H04W 28/06* (2013.01); *H04W 52/0216* (2013.01);
(Continued)

(58) Field of Classification Search
CPC ............ H04W 88/08; H04W 52/0216; H04W 52/0219; H04W 88/085; H04W 84/12; H04W 88/06
USPC .......................................... 370/328–332, 338
See application file for complete search history.

(56) References Cited

U.S. PATENT DOCUMENTS 6,141,763 A * 10/2000 Smith ....................... G06F 1/28
709/200
6,272,140 B1   8/2001 LaRowe, Jr. et al.
(Continued)

FOREIGN PATENT DOCUMENTS

EP   1207654 A2   5/2002
WO   97/48198 A2  12/1997
(Continued)

OTHER PUBLICATIONS

International Search Report and Written Opinion corresponding to the PCT application No. PCT/US06/09786, dated Sep. 25, 2007, 9 pages total.

(Continued)

*Primary Examiner* — Jae Y Lee
*Assistant Examiner* — Jean F Voltaire
(74) *Attorney, Agent, or Firm* — Davis Wright Tremaine LLP

(57) ABSTRACT

A network system comprises a first logic block providing a link to a first network via an access point of a WLAN and a second logic block communicating with a node of a second network (such as a WPAN) and configured to provide a link between the node and the first network via the access point. The network system is configured to maintain continuous connections to both the access point and the node while receiving power. The second logic block can communicate with the node using a modified communication protocol that is only partially compliant with an 802.11x communications protocol. A wireless hub can integrate a WPAN with a WLAN including, in part, a wireless circuit compliant with the WLAN standard (such as an 802.11x standard), a processor, and a memory. The wireless circuit can connect to the WPAN without losing connectivity (such as association and synchronization) to the WLAN.

20 Claims, 12 Drawing Sheets

Related U.S. Application Data

11/422,945, filed on Jun. 8, 2006, now Pat. No. 7,826,408, which is a continuation of application No. 11/376,729, filed on Mar. 14, 2006, now abandoned.

(60) Provisional application No. 60/661,763, filed on Mar. 14, 2005.

(51) Int. Cl.

| | |
|---|---|
| *H04W 84/12* | (2009.01) |
| *H04W 88/08* | (2009.01) |
| *H04W 28/06* | (2009.01) |
| *H04L 29/06* | (2006.01) |
| *H04W 88/06* | (2009.01) |
| *H04L 29/08* | (2006.01) |

(52) U.S. Cl.
CPC .......... *H04W52/0219* (2013.01); *H04W 84/10* (2013.01); *H04W 84/12* (2013.01); *H04W 88/08* (2013.01); *H04W 88/085* (2013.01); H04L 29/06 (2013.01); H04L 63/08 (2013.01); H04L 67/02 (2013.01); H04L 67/10 (2013.01); *H04W 88/06* (2013.01)

(56) References Cited

U.S. PATENT DOCUMENTS

| | | | |
|---|---|---|---|
| 6,505,253 B1 | 1/2003 | Chiu et al. | |
| 6,546,253 B1 * | 4/2003 | Chow | H04M 15/00 455/406 |
| 6,751,455 B1 | 6/2004 | Acampora | |
| 6,768,896 B2 | 7/2004 | Tjalldin et al. | |
| 6,771,933 B1 * | 8/2004 | Eng | H04W 88/085 370/338 |
| 6,842,460 B1 | 1/2005 | Olkkonen et al. | |
| 6,879,574 B2 | 4/2005 | Naghian et al. | |
| 7,003,102 B2 | 2/2006 | Kiko | |
| 7,039,358 B1 | 5/2006 | Shellhammer et al. | |
| 7,088,687 B2 | 8/2006 | Ayyagari et al. | |
| 7,095,748 B2 | 8/2006 | Vii et al. | |
| 7,190,972 B1 | 3/2007 | Hollister et al. | |
| 7,286,513 B2 * | 10/2007 | Nguyen | H04W 92/00 370/338 |
| 7,333,829 B2 | 2/2008 | Malone et al. | |
| 7,463,907 B2 | 12/2008 | Smith et al. | |
| 7,590,101 B2 | 9/2009 | Forand et al. | |
| 7,664,081 B2 | 2/2010 | Luoma et al. | |
| 7,733,885 B2 | 6/2010 | Ayyagari et al. | |
| 7,826,408 B1 | 11/2010 | Vleugels et al. | |
| 2002/0039357 A1 | 4/2002 | Lipasti et al. | |
| 2003/0119527 A1 | 6/2003 | Labun et al. | |
| 2003/0152110 A1 * | 8/2003 | Rune | H04J 3/0682 370/509 |
| 2004/0076136 A1 | 4/2004 | Beach | |
| 2004/0157551 A1 | 8/2004 | Gainey et al. | |
| 2004/0170120 A1 | 9/2004 | Reunamaki et al. | |
| 2004/0252674 A1 | 12/2004 | Soininen et al. | |
| 2004/0259544 A1 | 12/2004 | Amos | |
| 2004/0259552 A1 | 12/2004 | Ihori et al. | |
| 2005/0025104 A1 | 2/2005 | Fischer et al. | |
| 2005/0036484 A1 | 2/2005 | Barker | |
| 2005/0058112 A1 | 3/2005 | Lahey et al. | |
| 2005/0068965 A1 | 3/2005 | Lin et al. | |
| 2005/0073967 A1 | 4/2005 | Hennessey et al. | |
| 2005/0086393 A1 | 4/2005 | Meng et al. | |
| 2005/0099275 A1 | 5/2005 | Kamdar et al. | |
| 2005/0101260 A1 | 5/2005 | Hunt et al. | |
| 2005/0119025 A1 | 6/2005 | Mohindra et al. | |
| 2005/0176473 A1 | 8/2005 | Melpignano | |
| 2005/0192044 A1 * | 9/2005 | Travis | H04M 1/0254 455/550.1 |
| 2005/0238046 A1 | 10/2005 | Hassan et al. | |
| 2005/0286474 A1 | 12/2005 | van Zelst et al. | |
| 2006/0015621 A1 * | 1/2006 | Quinn | H04W 88/06 709/227 |
| 2006/0063560 A1 | 3/2006 | Herle | |
| 2006/0146868 A1 | 7/2006 | Ginzburg | |
| 2006/0165035 A1 | 7/2006 | Chandra et al. | |
| 2006/0203841 A1 | 9/2006 | Fischer | |
| 2006/0215601 A1 | 9/2006 | Vleugels et al. | |
| 2007/0093198 A1 | 4/2007 | Beckers | |
| 2008/0144493 A1 | 6/2008 | Yeh | |
| 2008/0291858 A1 | 11/2008 | Kandala et al. | |
| 2009/0086619 A1 | 4/2009 | Santhoff et al. | |

FOREIGN PATENT DOCUMENTS

| | | |
|---|---|---|
| WO | 03/065654 A1 | 8/2003 |
| WO | 2006/099588 A2 | 9/2006 |

OTHER PUBLICATIONS

The State Intellectual Property Office of the People's Republic of China, First Office Action for Application No. 200680013461.6, dated May 12, 2010, 24 pages total.
Office Action for U.S. Appl. No. 11/422,945, dated Nov. 21, 2008.
Office Action for U.S. Appl. No. 11 /422,945, dated Oct. 22, 2009.
Notice of Allowance for U.S. Appl. No. 11/422,945, dated Jun. 23, 2010.
Office Action mailed Oct. 10, 2012 in U.S. Appl. No. 12/892,825, 18 pages.
Office Action mailed Dec. 6, 2012 in U.S. Appl. No. 13/560,917, 48 pages.
Notice of Allowance, mailed Aug. 29, 2013, in U.S. Appl. No. 13/560,917, 6 pages.

* cited by examiner

APPARATUS AND METHOD FOR INTEGRATING SHORT-RANGE WIRELESS PERSONAL AREA NETWORKS FOR A WIRELESS LOCAL AREA NETWORK INFRASTRUCTURE

CROSS-REFERENCES TO RELATED APPLICATIONS

This application incorporates by reference herein U.S. patent application Ser. No. 11/376,753, filed Mar. 14, 2006, hereinafter referred to as "Vleugels I", and U.S. Provisional Patent Application No. 60/661,746.

FIELD OF THE INVENTION

The present invention generally relates to wireless communications. More particularly, the invention relates to seamlessly integrating short-range wireless personal area networks ("WPANs") into longer-range wireless local area networks ("WLANs").

BACKGROUND OF THE INVENTION

FIG. 1 depicts some parameters associated with a few existing and emerging standards for wireless connectivity. Based on targeted range and supported data rates, these standards can be grouped into four categories: wireless wide area networks ("WWANs"), wireless metropolitan area networks ("WMANs"), wireless local area networks ("WLANs") and wireless personal area networks ("WPANs").

An example of a wireless local area network ("WLAN") is an 802.11x (x=a, b, g, n, etc.) network. An 802.11x NIC (network interface card) or 802.11x built-in circuitry might be used for networking an electronic device to the outside world, or at least to devices at other nodes of a WLAN 802.11x network.

The 802.11x specifications uses unlicensed, free spectrum in either the 2.4 GHz or 5 GHz frequency bands, supporting data rates of up to 54 Megabits per second (Mbps) and ranges of 300 feet and more. The 802.11x standard, also known as Wi-Fi, was adopted several years ago, and is now being widely deployed for WLAN connectivity in homes, offices and public places like airports, coffee shops and university campuses.

The adoption and deployment of 802.11x-compliant equipment has experienced tremendous growth in recent years. The majority of laptops manufactured today include a built-in wireless circuit compliant with some variant of the 802.11x standard. While originally devised for enabling wireless network connectivity ("wireless Ethernet"), WLAN connectivity based on the 802.11x standard is rapidly finding its way in new applications like mobile phones—primarily driven by the adoption of Voice-over-IP ("VoIP")—and consumer electronics (home entertainment, video streaming, etc.). In addition, with the development of the new 802.11n specification, and the proliferation of citywide 802.11x deployment initiatives, the 802.11x standard is expanding into longer range applications.

FIG. 2 illustrates a typical 802.11x WLAN configuration in infrastructure mode 1. Although the 802.11x standard supports two modes of operation, namely ad-hoc mode and infrastructure mode, the infrastructure mode is used more often. In the infrastructure mode, a dedicated 802.11x wireless circuit, also called an access point ("AP"), is necessary for and manages an infrastructure network. AP 2 is configured specifically to coordinate the activities of the infrastructure network and to enable connectivity to, for example, the Internet or other WLANs via an Internet router 3, which may be disposed in AP 2. Other 802.11x-compliant wireless circuits, hereafter alternatively referred to as stations ("STAs") 4 can become a member of the infrastructure network by going through an authentication and association procedure. Additional security procedures may be required as well. Once associated with the infrastructure network, a STA 4 can communicate with AP 2. A STA 4 may communicate with other STAs 4 of infrastructure network 1 via AP 2. Furthermore, a STA 4 may communicate with STAs of other infrastructure networks (not shown) via AP 2. On a regular basis, the STAs listen to the beacons and pending traffic from the AP 2.

In contrast to WLAN, no such unifying standard exists for WPAN. Instead, a number of proprietary and standardized communication protocols have been and are being developed for establishing short-range WPAN connectivity. Standardized protocols include the Bluetooth specification (based on the IEEE 802.15.1 standard), the recently approved Zigbee specification (based on the IEEE 802.15.4 standard), and the Ultra-Wideband ("UWB") specification which is still under development. In addition, there are several proprietary protocols in the unlicensed 27 MHz, 900 MHz, and 2.4 GHz frequency bands developed for the sole purpose of providing short-range wireless connectivity. Examples include Cypress Semiconductor's proprietary wireless USB solution, or Logitech's proprietary FastRF solution. The lack of a unified standard is hindering the widespread adoption of WPAN technologies. In addition, several WPAN communication protocols co-exist in the same 2.4-GHz frequency band as a commonly used version of the WLAN protocol. Because they use different methods of accessing the wireless medium, and are not synchronized with one another, severe interference may result when devices conforming to such standards are made to co-exist and are positioned in the same physical vicinity.

One alternative for avoiding the above mentioned problems when seeking to establish interoperability between WPAN and WLAN networks, is to use network interface circuitry based on the WLAN protocol in WPAN STAs. However, the power dissipation of the resulting STA would be several orders of magnitude higher than what is acceptable in typical WPAN applications. WPAN technologies are typically used to establish communication with a remote battery-operated device for which it is inconvenient, impractical, or may be impossible to replace batteries. Examples include security sensors in windows, wearable or implanted medical monitoring devices or environmental sensors to monitor temperature, humidity or other environmental parameters. To minimize the frequency at which batteries need replacement, maximizing the battery life is of paramount importance, thus placing stringent requirements on the power that can be dissipated in establishing and maintaining the wireless communication link.

The power dissipation of a standard WLAN STA is several orders of magnitude higher than what is acceptable in most battery-operated devices for a number of reasons. First, in order to be able to communicate with the AP, which may be, for example, 300 feet away, a standard WLAN STA transmits at high transmit powers (up to 20 dBm) and is also required to receive relatively weak signals, attenuated heavily by the path loss it encounters in the over-the-air transmission. Second, the WLAN must adhere to stringent receiver sensitivity requirements. Both the transmit and receive requirements result in relatively large power dissipation in the network interface circuits. Furthermore, WLANs typically operate at relatively high data rates (up to 54 Mbps). It is thus undesirable to have a STA that is part of an infrastructure network to communicate at lower data rates, since such a STA will slow down the entire infrastructure network. This is the case because some of the communication between the AP and its associated STAs occurs at the lowest common data rate supported by all STAs. The noise and linearity requirements associated with transmitting at high data rates thus result in large power dissipation of the wireless 802.11x wireless circuit. Furthermore, there is significant protocol overhead associated with the services and procedures required to establish and maintain an association with an infrastructure network. This overhead translates directly in higher power dissipation. As a member of an infrastructure network coordinated by an AP, the STA has, on a regular basis, to listen to the beacons transmitted by the AP. Also, although the 802.11x standard specifies power save modes that allow the STA to skip some of the beacons, the STA is still required to wake up on a regular basis to maintain association and synchronization with the AP.

Accordingly, a need continues to exist for a method and apparatus that overcome the above-described problems and enable seamless integration of WPAN into WLAN infrastructure, and at power dissipation levels that meet the stringent requirements of battery-operated devices.

BRIEF SUMMARY OF THE INVENTION

A wireless hub for integrating a wireless personal area network ("WPAN") seamlessly into a wireless local area network ("WLAN") includes, in part, a wireless circuit compliant with the WLAN standard, a processor coupled to the wireless circuit and a memory module that is coupled to the wireless circuit and the processor.

In some embodiments, the WLAN standard is the 802.11x standard. In such an embodiment, the wireless circuit is an 802.11x-compliant wireless circuit, and the memory module may be integrated with the wireless circuit. The hub further includes software modules forming a software platform that allows the wireless circuit to connect to both the WPAN and WLAN. In accordance with one embodiment, the software platform allows the wireless circuit to connect to the WPAN, without losing connectivity (such as association and synchronization) to the WLAN. In another embodiment, the wireless circuit is configured to connect to the WLAN and WPAN alternately. In some embodiments, an operating system enables the operation of the wireless hub, thereby enabling users to write application-specific application software. The operating system may be Windows XP, Windows CE, Linux, Symbian, or the like, that may be used to develop additional applications.

In accordance with one embodiment, the wireless hub is seamlessly integrated into an electrical power outlet. This allows the hub to be unobtrusively and conveniently integrated in a home, business or industrial setting. Such embodiments are hereinafter alternatively referred to as "Wi-Fi-enabled power outlets". As is known, "Wi-Fi" is often used to refer to "wireless fidelity", and refers to 802.11x-based radio technologies.

Advantageously, the present invention extends the communication range of power-sensitive battery-operated devices and allows power-sensitive battery operated devices to become part of the larger WLAN infrastructure, thus enabling monitoring and control from any location that is within the range covered by the WLAN In addition, since battery-operated devices are IP addressable and since the AP of the WLAN can be connected to the Internet via an Internet router, the battery-operated devices may be monitored and controlled from any location when access to the Internet is available. The longer communication range and seamless integration into the larger WLAN infrastructure is obtained without incurring the power penalty that is typically unavoidable in longer range communication and is inherent to the protocol overhead of typical WLAN networks.

Other objects, features, and advantages of the present invention will become apparent upon consideration of the following detailed description and the accompanying drawings, in which like reference designations represent like features throughout the figures.

DESCRIPTION OF THE INVENTION

Figure 1:
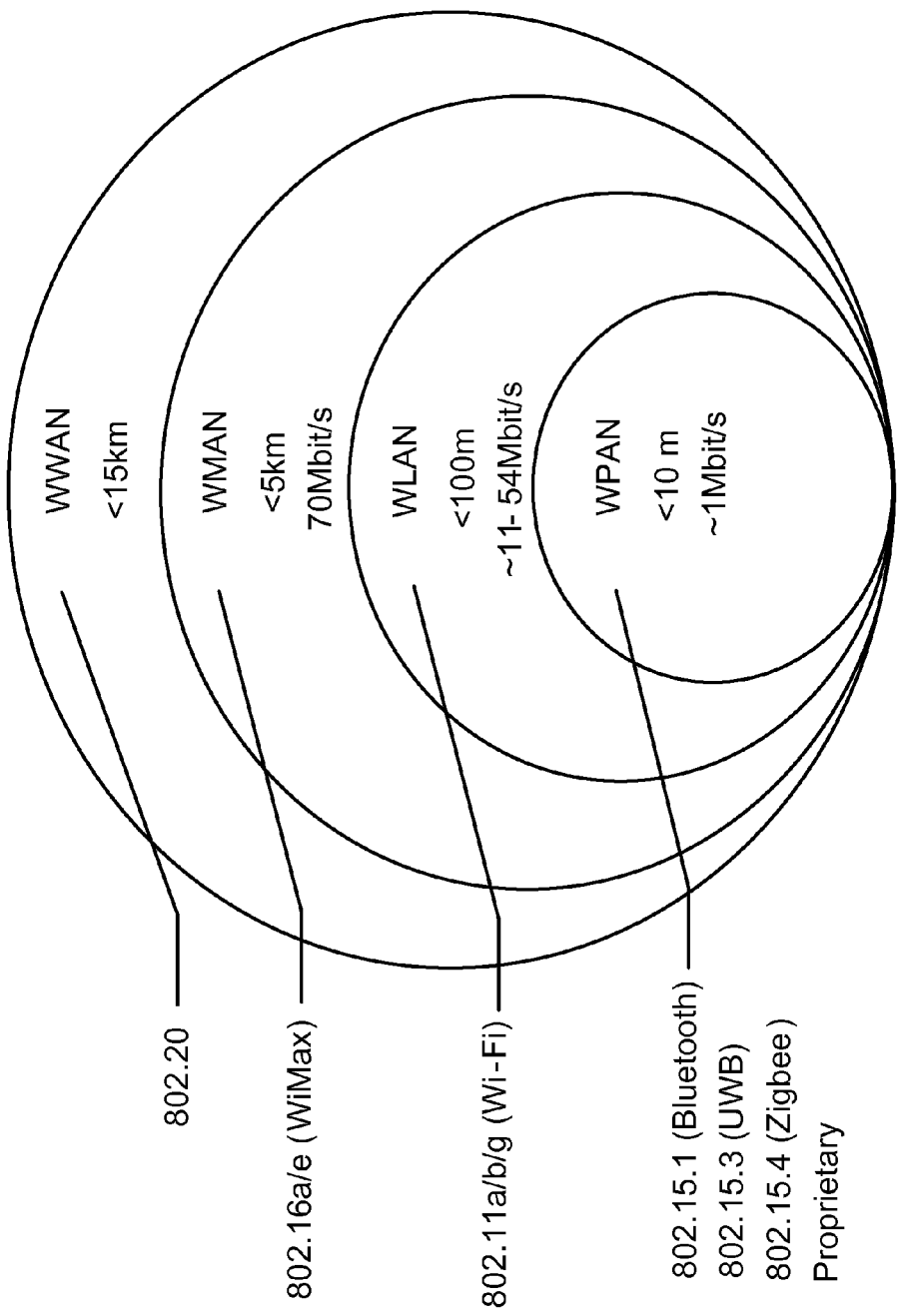
FIG. 1 depicts a number of parameters associated with a few existing and emerging standards for wireless connectivity, as known in the prior art.
Figure 2:
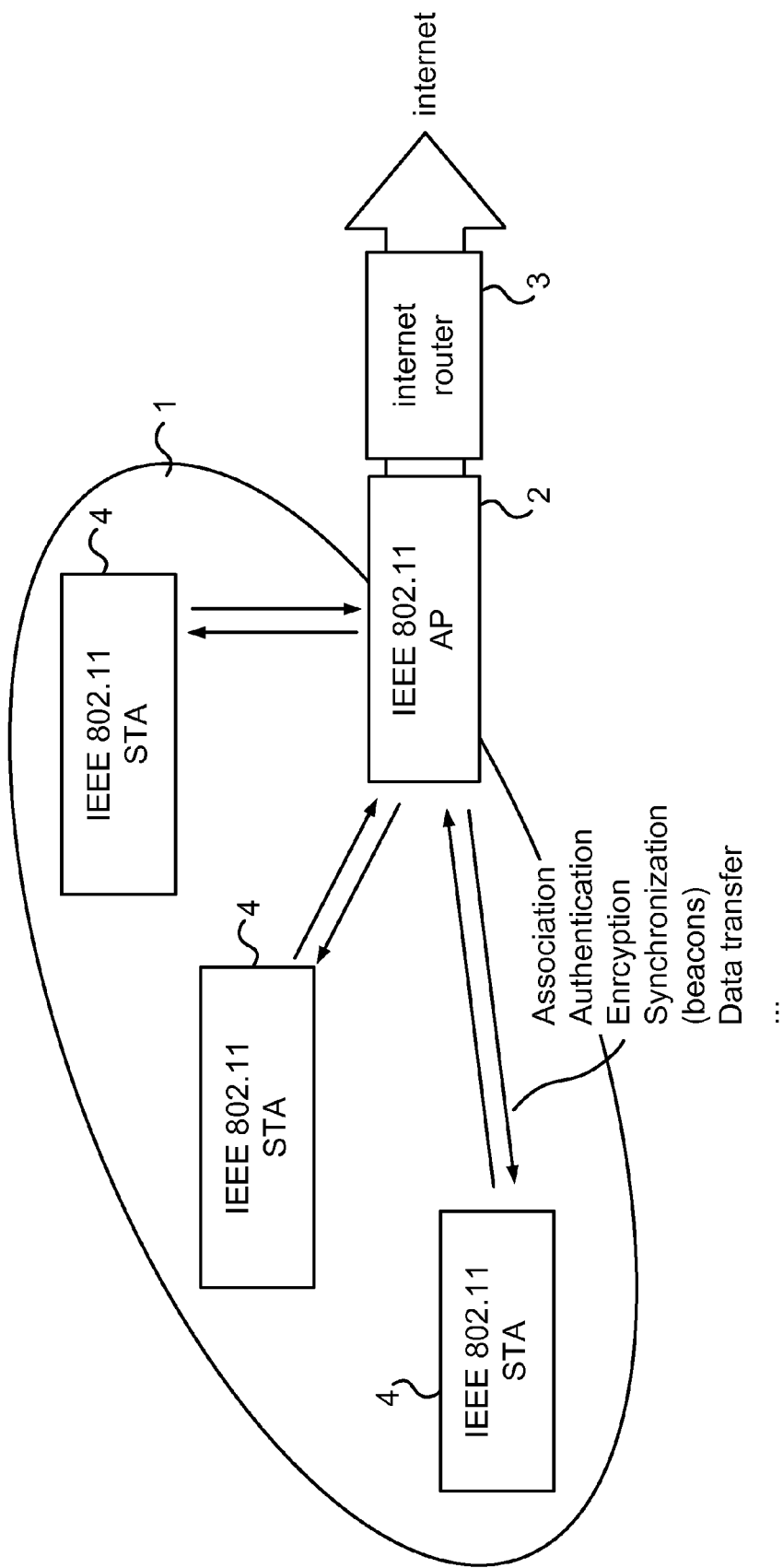
FIG. 2 illustrates some of different components of an 802.11x WLAN in infrastructure mode, as known in the prior art.
Figure 3:
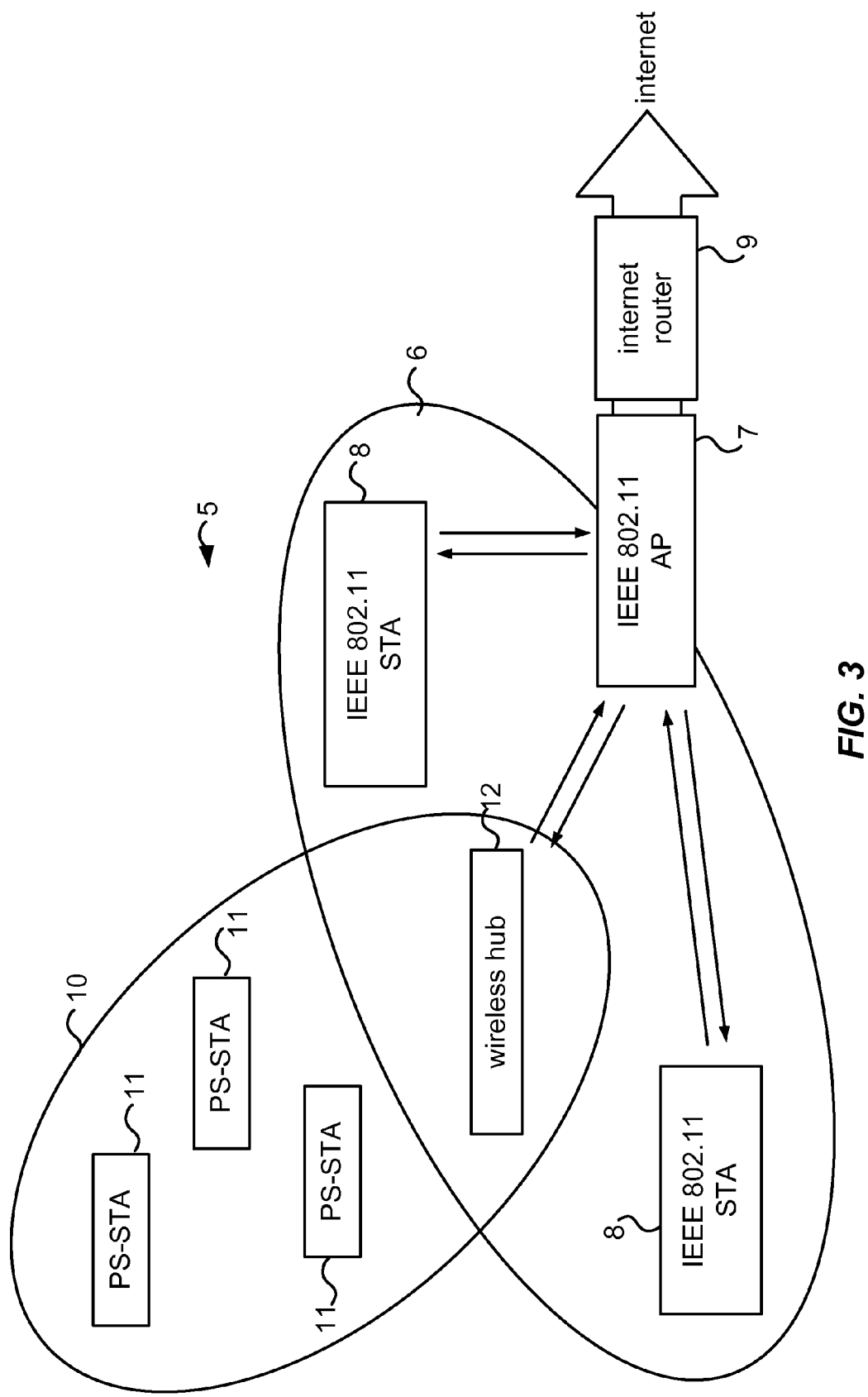
FIG. 3 illustrates an apparatus configured to integrate a wireless personal area network ("WPAN") into a wireless local area network ("WLAN"), in accordance with an embodiment of the present invention.

FIG. 3 illustrates a wireless personal area network ("WPAN") 10 integrated with wireless local area network ("WLAN") 6 to form an integrated network 5, in accordance with one embodiment of the present invention. In the embodiments described below, WLAN 6 is compliant with the 802.11x specification. It is understood, however, that the WLAN may be compliant with other protocols, such as WiMax. WLAN 6 may operate either in ad-hoc or in infrastructure mode. Moreover, the following description is provided with reference to the infrastructure mode of operation of WLAN 6. It is understood that the present disclosure equally applies to the ad-hoc or any other mode. The infrastructure WLAN 6 is shown as including an AP 7 and one or more STAs 8. STAs 8 are associated with and synchronized to AP 7 and periodically listen to beacons from AP 7.

Each STA 8 is configured to include an 802.11x-compliant wireless circuit, such as a wireless enabled computer, a wireless Personal Digital Assistant, a Wi-Fi enabled cellular phone, or the like. The AP 2 can be connected to the Internet via an Internet router 9. Internet connectivity can be established through any number of communication services, including Digital Subscriber Line ("DSL"), cable, satellite, or the like, as is well known.

WPAN 10 is shown as including one or more power-sensitive stations 11 ("PS-STA"). A PS-STA is defined herein as a device that is battery-operated and for which maximizing battery-life is beneficial to the application and/or user. Examples of PS-STAs include peripherals and accessories for personal computers, cellular phones, home entertainment accessories such as remote controls, monitoring devices for security, automation medical applications, or the like.

In accordance with one embodiment, a PS-STA is typically in a sleep mode the majority of the time, only waking up occasionally to communicate and exchange information with the outside world. In some systems described herein, each PS-STA 11 is equipped with a wireless circuit that can communicate directly with a standard 802.11x-compliant wireless circuit. PS-STAs 11 however are not required to be fully compliant with the 802.11x specification; some PS-STAs 11 may have reduced power dissipation thereby extending the battery life.

In embodiments in which PS-STAs 11 are not fully compliant with the 802.11x specification, the drivers or firmware of the 802.11x-compliant wireless circuit at the other end of the communication link (i.e., the device with which the PS-STA is interacting) may require modification. Thus, in some implementations, both the wireless circuit at the other end as well as the PS-STA are 802.11x-compliant, while in others the wireless circuit at the other end is 802.11x-compliant, but the PS-STA is not a fully compliant 802.11x wireless circuit, while in yet other implementations the driver or firmware of the 802.11x-compliant wireless circuit at the other end of the link requires modifications to accommodate the PS-STA. Integrated network 5 is also shown as including a wireless hub 12 adapted to facilitate seamless communication between the WLAN and the WPAN. The wireless hub 12 includes, in part, a wireless 802.11x-compliant wireless circuit that can communicate with the AP 7 disposed in infrastructure WLAN 6 as well as with PS-STAs 11 disposed in WPAN 10. If more than one PS-STA is present in the WPAN, the wireless hub coordinates the timing and communication with each of the PS-STAs. In some embodiments, it may be desirable to shift as much as possible of the protocol overhead associated with the communication between wireless hub 12 and the PS-STAs 11 such as, for example, access to the medium, reservation of the medium, synchronization, etc., onto the wireless hub 12, where power consumption is much less of a concern compared to the PS-STA. In such cases, the driver or firmware of the 802.11x-compliant components disposed in wireless hub 12 may require modification To operate, wireless hub 12 is placed within the range of the AP 7 of the infrastructure WLAN 6; this range is typically on the order of 300+ feet. The wireless hub 12 is also be placed within the range of each of the PS-STAs 11 in the WPAN 10 The PS-STAs 11 typically have a range of about 30 feet. This range can be longer or shorter depending on the application.

In one embodiment, the wireless hub 12 (alternatively referred to herein below as a "hub") is seamlessly integrated within an electrical power outlet. In a different embodiment, the hub can be a separate device that can be plugged into a power outlet. The wireless hub 12 can also be integrated inside other electronic devices, such as light bulbs, light switches, thermostats, energy meters, personal computers, Personal Digital Assistants ("PDAs"), cellular phones, home entertainment equipment and the like.

Figure 4:
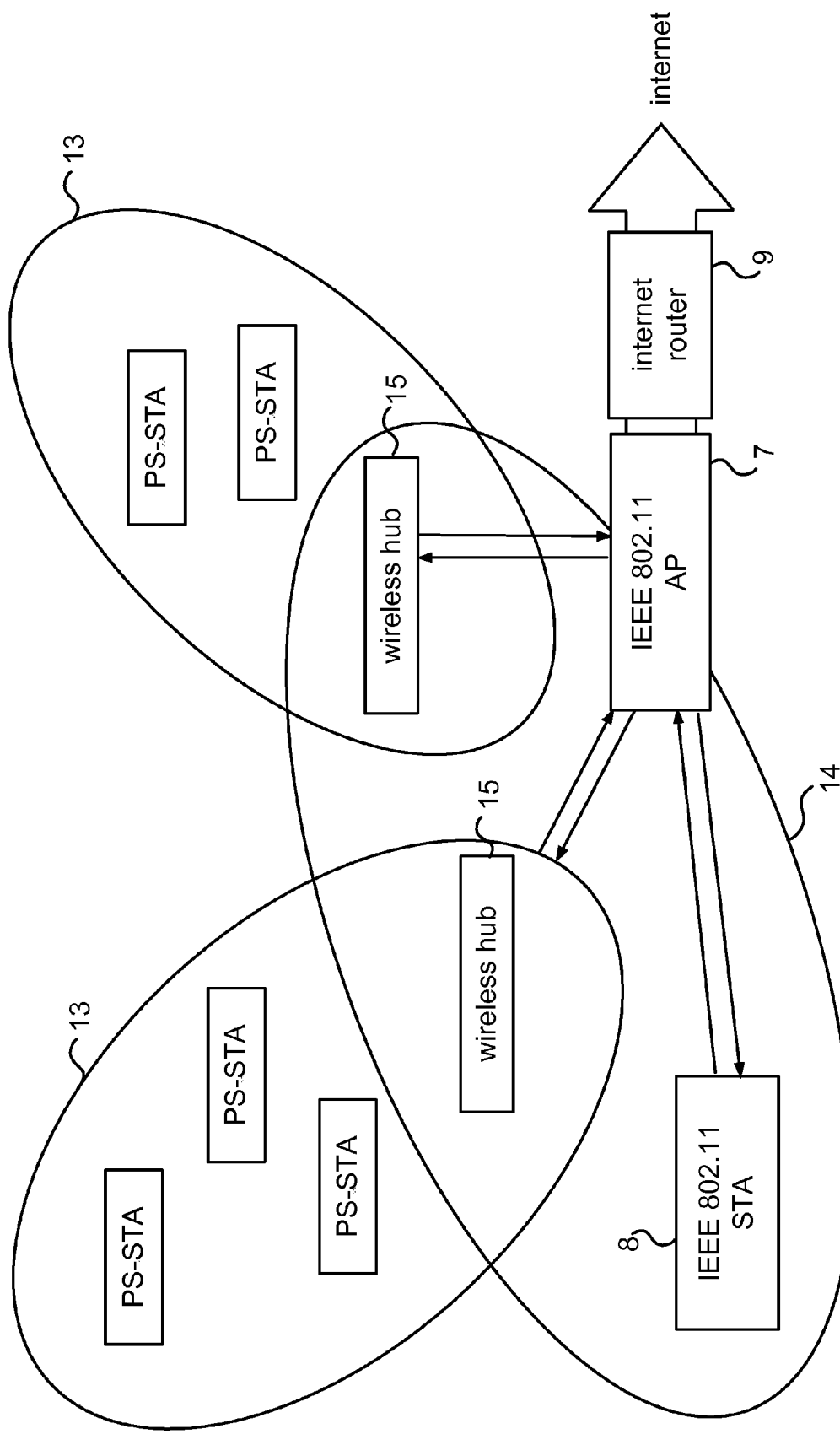
FIG. 4 illustrates a number of WPANs integrated into a WLAN, in accordance with one embodiment of the present invention.

In some embodiments, a multitude of WPANs 13 may be so configured so as to be coupled to and in communication with a single WLAN 14, as shown in FIG. 4. Each WPAN 13 is coupled to the WLAN 14 by using a wireless hub 15, as described above. If WPANs 13 are configured to operate independently, no additional coordination is required and each wireless hub 15 decides autonomously when to communicate with each of its respective PS-STAs under its control. However, in cases where additional coordination between the different WPANs is desirable, the necessary timing and control information can be exchanged between the wireless hubs 15 via the longer-range WLAN 14.

Figure 5:
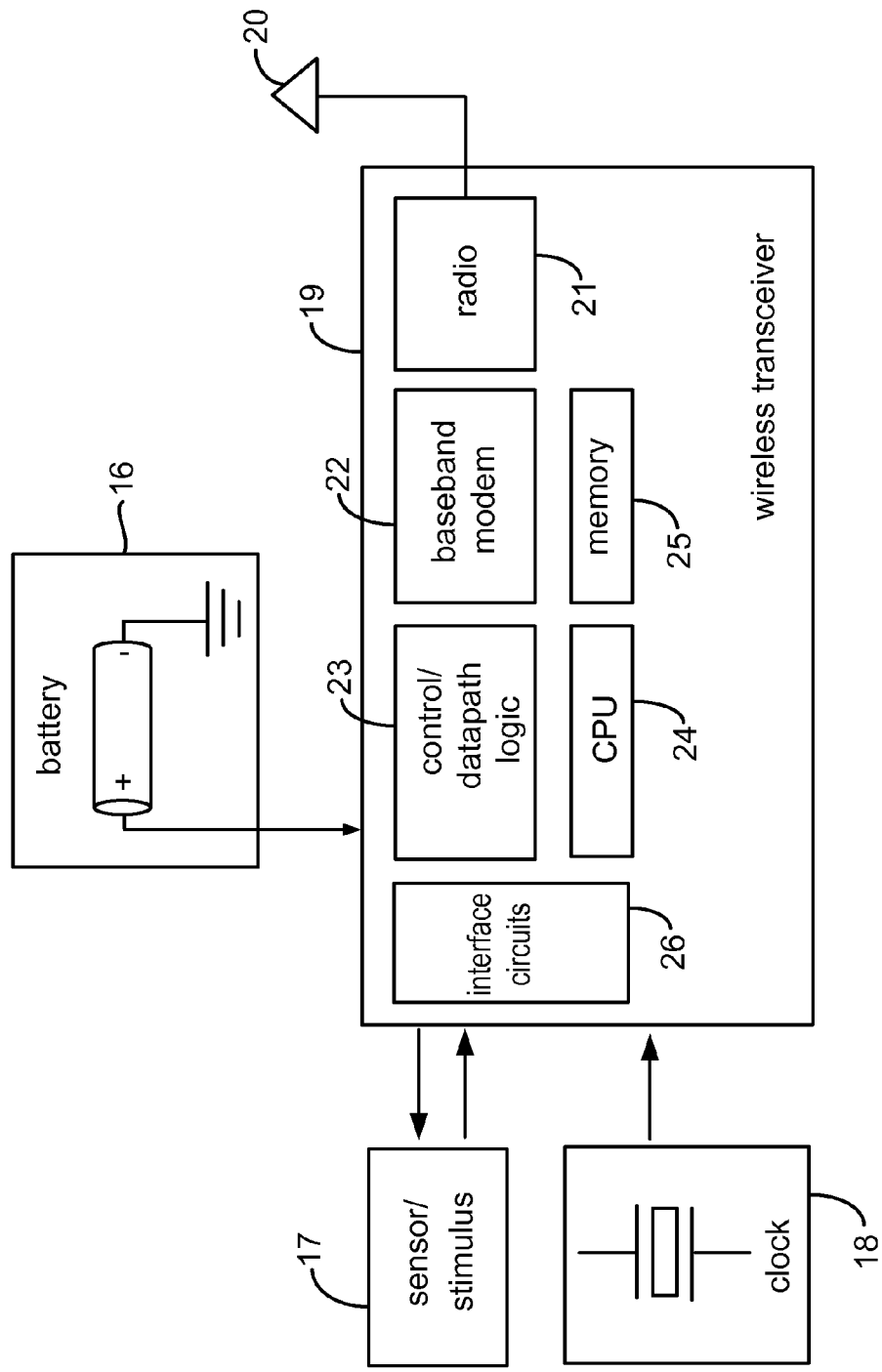
FIG. 5 is a simplified high-level block diagram of a power-sensitive station ("PS-STA"), in accordance with an embodiment of the present invention

FIG. 5 illustrates some of the components disposed in a PS-STA 11, in accordance with one embodiment. PS-STA 11 typically includes, in part, a battery 16, a sensor or stimulus unit 17, a clock or crystal 18, a wireless circuit 19 and an antenna 20. Although not shown, other components like capacitors, resistors, inductors, an external power amplifier ("PA") and an external low-noise amplifier ("LNA") may also be included in PS-STA 11. Wireless circuit 19 is configured so as to communicate over the physical layer ("PHY") of a standard 802.11x-compliant circuit chip disposed in the wireless hub (see FIGS. 3 and 4). Wireless circuit 19 may be an embedded System-on-Chip ("SoC"), having disposed therein a radio 21 operating, for example, in the unlicensed 2.4-GHz and/or 5-GHz frequency bands, a baseband modem 22, dedicated control and datapath logic 23, a central processing unit ("CPU") 24, a memory module 25 and interface circuitry 26. CPU 24 and memory module 25 are used to implement the portion of the communication protocol that is not implemented in the dedicated control and datapath logic (also referred to as the 802.11x device drivers), together with any application-specific software. Wireless circuits are well known in the art and are not described herein.

Figure 6:
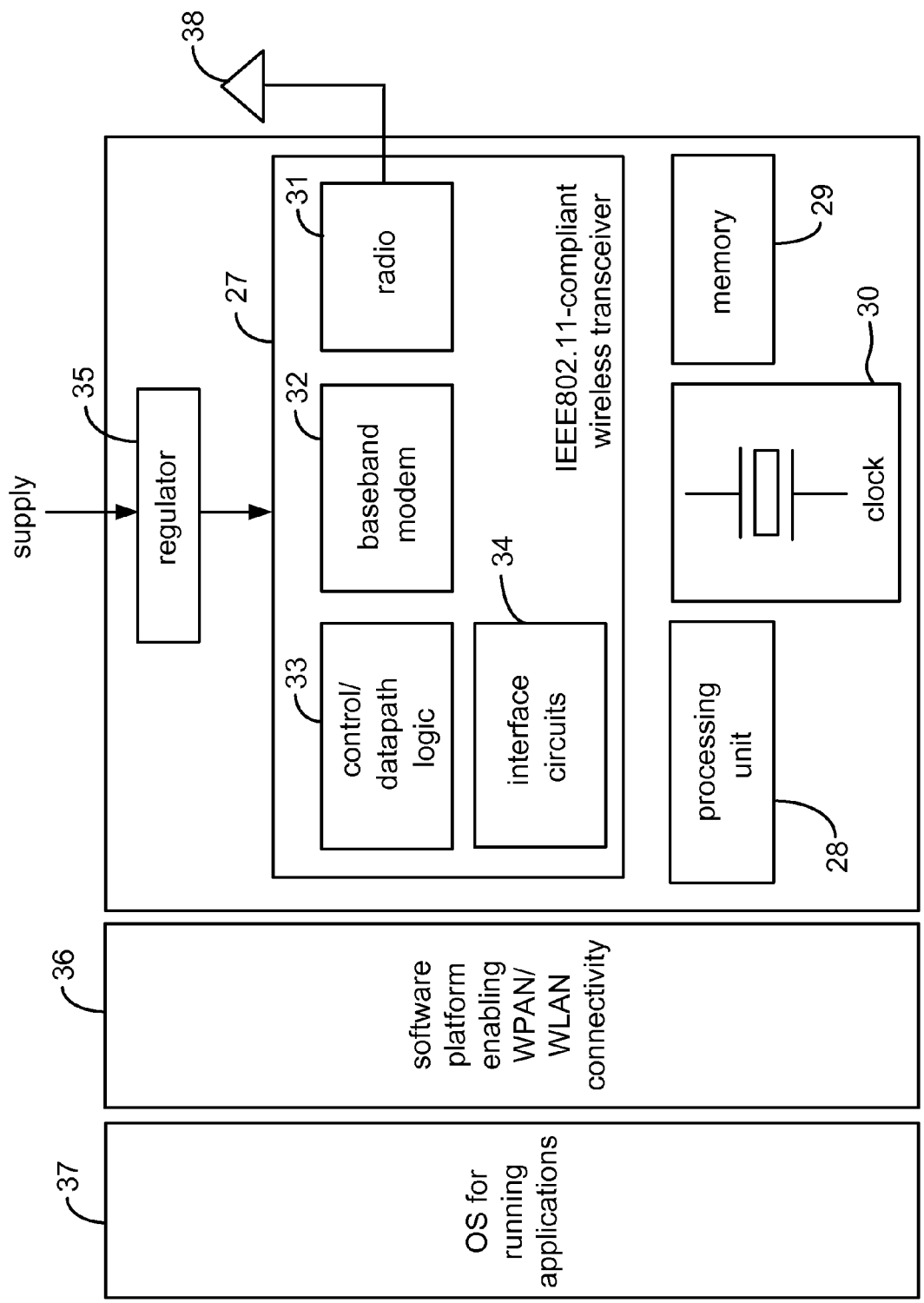
FIG. 6 is a simplified high-level block diagram of a wireless hub configured for use as a bridge between a WPAN and a WLAN.

FIG. 6 shows various blocks of a wireless hub, such as wireless hubs 12 and 15 shown respectively in FIGS. 3 and 4, in accordance with one embodiment. The wireless hub acts as a pivot and provides communication between the corresponding WPAN and WLAN. The wireless hub includes an 802.11x-compliant wireless circuit 27, a processing unit 28 coupled to or integrated with the 802.11x-compliant circuit, a memory module 29 that is coupled to or integrated with the 802.11x-compliant circuit, a crystal or clock 30, and an antenna 38. The 802.11x-compliant circuit 27 is shown as including a radio 31 operating, for example, in the unlicensed 2.4-GHz and/or 5-GHz frequency bands, a baseband modem 32, and dedicated control and datapath logic 33. Interface circuitry 34 provides an interface to the processing unit 28 and memory module 29. Wireless hub may be connected to the power grid, in which case no batteries are needed to operate the device. Regulator 35 is adapted to regulate the supply. The wireless hub may further include various passive components like capacitors, resistors and/or inductors and an external power amplifier ("PA") and/or external low-noise amplifier ("LNA") (not shown).

The wireless hub further includes a number of software modules forming a software platform 36 that enable circuit 29 to communicate with both the WPAN and WLAN. In one embodiment, the software platform 36 enables circuit 27 to connect to the WPAN, without losing connectivity (such as association and synchronization) to the WLAN, as described in Vleugels I. Circuit 27 can be connected to the WLAN and WPAN in alternating cycles, however added latency would be incurred.

In some embodiments, the wireless hub may further include an operating system 37 that may be used to write application-specific software. The operating system may be, for example, Windows XP, Windows CE, Linux, Symbian, or any operating system that may enable writing of applications.

The processing unit 28 and memory module 29 are used to implement that portion of the communication protocol that is not implemented in dedicated control and datapath logic; this portion of the communications protocol is referred to as the 802.11x device driver. If the communication protocol between the wireless hub and a PS-STA is modified to reduce power consumption of the PS-STA, the 802.11x device driver may also require slight modification to accommodate such changes. The CPU and memory module are also used for the implementation of the software platform that enables concurrent or alternating WLAN/WPAN connectivity, and can furthermore be used to run application-specific software.

Figure 7:
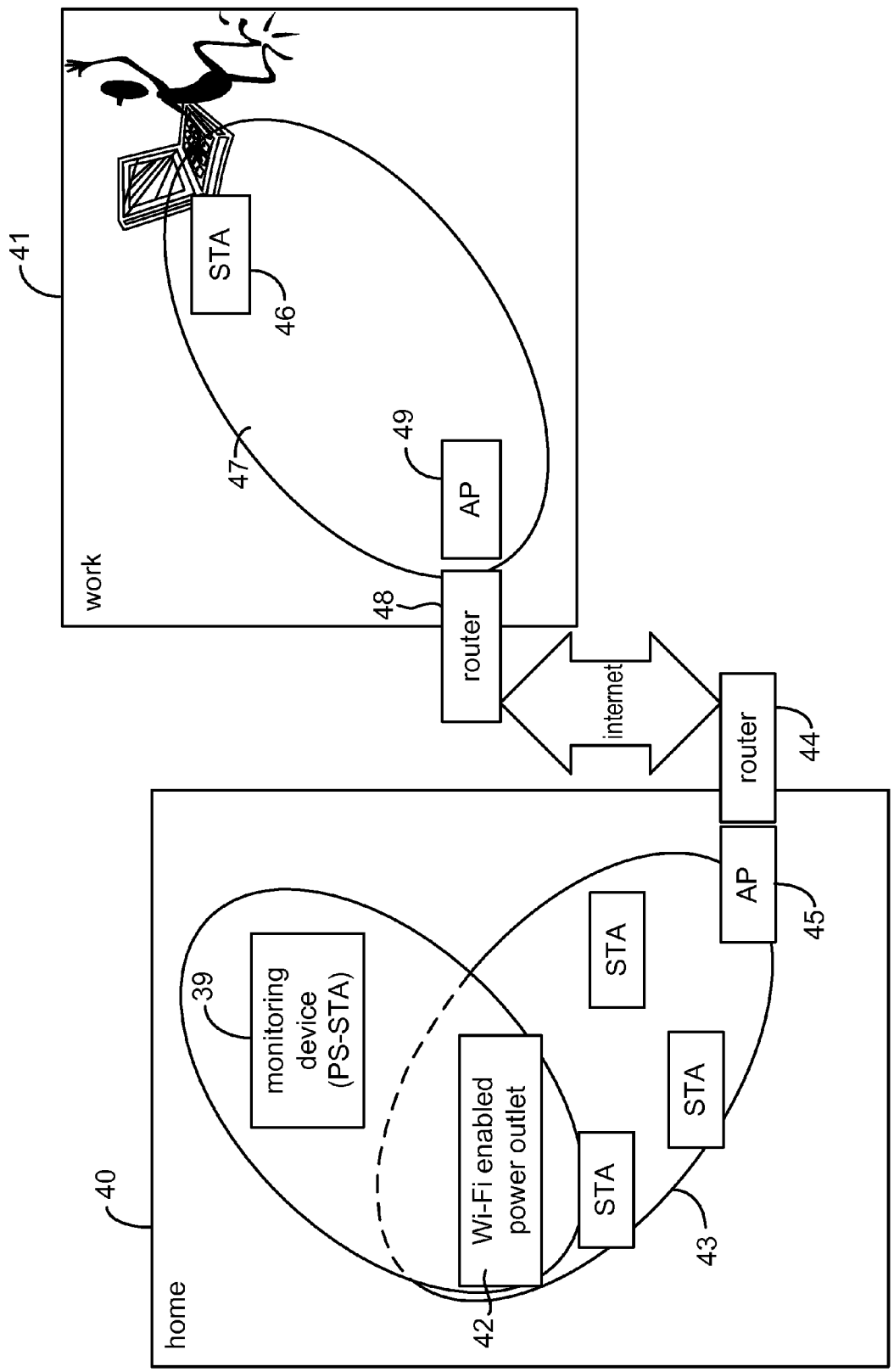
FIG. 7 illustrates a WPAN used for remote monitoring and controlling, in accordance with one embodiment of the present invention.

The following example is provided to further aid in understanding the invention. FIG. 7 illustrates a WPAN used for remote monitoring and controlling, in accordance with one embodiment of the present invention. A user desires to check one or more security monitoring devices 39 inside or around his house 40 while at work 41. Each security monitoring device is a PS-STA and is wirelessly connected to a Wi-Fi-enabled power outlet 42. The Wi-Fi-enabled power outlet is furthermore within the range of a WLAN infrastructure network 43 which the user is assumed to have set up at his home.

The WLAN infrastructure network 43 is adapted to establish communication with the Internet via an Internet router 44 that is coupled to the AP 45. At the office, the user has access to a laptop 46 that is equipped with an 802.11x-compliant wireless circuit. This circuit is associated with a WLAN infrastructure network 47 that has been set up in the user's office 41. The WLAN network 47 is adapted to establish communication with the Internet via an Internet router 48 that is coupled to the infrastructure's network AP 49. The connection at the office may be wireless or wired. In a wired office environment, the user's laptop is hooked up directly through the Internet router 48 with a cable, without making use of the WLAN 47.

Application software on the user's laptop 46 allows the user to poll information from a specific PS-STA at home. To do so, the user sends a poll request, which contains the information required to unambiguously identify the PS-STA of interest, and possibly additionally information about the data to be retrieved. Destination address information includes the address of the router 44, the address of the Wi-Fi-enabled power outlet 42 that controls the PS-STA of interest and the address of the PS-STA 39 itself. PS-STA address is typically required where multiple PS-STAs are connected to, for example, a single Wi-Fi-enabled power outlet. The poll request is transmitted over the WLAN 47 in the office, and via Internet router 48 transported over the Internet to the Internet router 44 at the home. At the user's home, the poll request is directed to the Wi-Fi-enabled power outlet that coordinates the PS-STA of interest. The Wi-Fi-enabled power outlet receives this request over the home's infrastructure WLAN. If the requested information has already been retrieved from the PS-STA during a previous data transfer event, the Wi-Fi-enabled power outlet responds to the poll request by sending the requested information over the home's infrastructure WLAN 43 to the Internet router that is connected to the home's WLAN AP. The requested information is transported over the Internet to the Internet router at the office, and from there directed to the user's laptop over the offices WLAN infrastructure network. Application software on the user's laptop receives the information and presents it to the user. In case the requested information has not yet been previously retrieved from the PS-STA, the Wi-Fi-enabled outlet does so during the next scheduled WPAN communication event. The timing of the occurrence of this event, depends, in part, on the power management techniques used for the WPAN communication.

To conserve power, the PS-STAs are typically mostly in sleep mode and only occasionally wake up as needed to transmit or receive data and/or control signals. When connected to the WPAN coordinated by the Wi-Fi-enabled power outlet 42, a PS-STA 39 is synchronized to the Wi-Fi-enabled power outlet 42, which as part of the infrastructure network, is in turn synchronized to the AP 45. The synchronization between the PS-STAs and the Wi-Fi-enabled power outlet ensures that the Wi-Fi-enabled power outlet is in WPAN mode at the same time that a PS-STA wakes up to transmit or receive. The above example describes an instance where the information from a single PS-STA is remotely accessed, using a Wi-Fi-enabled power outlet. It is understood that the wireless hub does not have to be a Wi-Fi-enabled power outlet, and may be any wireless hub, as described above. Furthermore, it is understood that multiple PS-STAs may be connected to a single as well as to multiple wireless hubs. The present invention may also be used to activate or steer PS-STAs, in addition to monitoring or retrieving information.

In some embodiments, rather than having data transfer be triggered by a poll request, the PS-STAs may also transmit data to the wireless hub periodically. In such embodiments, the retrieved data can be stored and/or processed locally on the wireless hub, or, alternatively, be transferred to a different location.

The association of a PS-STA with a wireless hub may or may not be static. In some embodiments, the PS-STA may be attached to a moving object, in which case the nearest wireless hub is dynamic and may change over time. This scenario is common in the context of medical monitoring/treatment. In such embodiments, medical sensors and stimulus devices in, on and around a person's body communicate to a nearby wireless hub that acts as a seamless bridge between the low-power WPAN and the longer-range WLAN. As the person/patient moves around the house, the nearest wireless hub may change over time. In such applications, seamless transitioning between wireless hubs is carried out and includes dynamic association capabilities inside the PS-STA, as well as software on the wireless hub side to seamlessly handle the required hand-offs among wireless hubs. The present invention is also applicable, for example, to the following situations:

Remote medical monitoring

Medical monitoring/treatment in hospitals

In-house monitoring and control from any location to any location

Industrial monitoring/warehouse monitoring

Home automation

Energy metering

PC, cell phone and home entertainment peripherals and accessories

The following are among the advantages of embodiments of the present invention:

Cost savings associated with infrastructure/hardware re-use

Integration of low-power short-range networks in the ubiquitous WLAN infrastructure results in cost savings since already-present hardware can be re-used. Little or no dedicated set up is required to enable the short-range connectivity IP-addressable PS-STAs, enabling remote monitoring Low-power short-range networks typically act as isolated networks. As a consequence, such networks can only be accessed when in close vicinity. This enables access to the WPAN from any location that is within the coverage area of the WLAN, or even from a remote location. Unlike other low-power wireless technologies, the power-sensitive nodes described herein are IP-addressable and, consequently, can be monitored and/or controlled from any location that has Internet access.

Long-range connectivity is achieved, without putting the associated burden on the power-sensitive device The burden of achieving long-range connectivity is shifted away from the power-sensitive device onto the wireless hub. Since typically, the wireless hub is a powered device, power dissipation is not much of an issue.

As a result, a power-sensitive battery-operated device can be connected to the ubiquitous WLAN infrastructure without having to bear the consequences in terms of power dissipation and protocol overhead that are typically associated with this.

SPECIFIC EXAMPLES

A WPAN is a short-range wireless network, with typical coverage ranges on the order of 30 feet, usable to connect peripherals to devices in close proximity, thereby eliminating cables usually present for such connections. For example, a WPAN might be used to connect a headset to a mobile phone or music/audio player, a mouse or keyboard to a laptop, a PDA or laptop to a mobile phone (for syncing, phone number lookup or the like), etc. Yet another example of a WPAN application is a wireless medical monitoring device that wirelessly connects monitoring hardware to a pager or similar read-out device. Yet another example is a remote control that connects to a wireless-enabled electronic device.

A WPAN is generally used for the interconnection of information technology devices within the range of an individual person, typically within a range of 10 meters. For example, a person traveling with a laptop will likely be the sole user of that laptop and will be the same person handling the personal digital assistant ("PDA") and portable printer that interconnect to the laptop without having to plug anything in, using some form of wireless technology. Typically, PAN nodes interact wirelessly, but nothing herein would preclude having some wired nodes. By contrast, a WLAN tends to be a local area network ("LAN") that is connected without wires and serves multiple users.

Communication with the WPAN device might use an SWN protocol that is only partially compliant with the protocol used over a conventional WLAN and might do so without interference from the conventional WLAN, yet usage of the WLAN is such that the WPAN device and computing device can communicate without interference. To reduce interference, the computing device coordinates the usage of the wireless medium with devices of a WLAN that may be active in the same space. Coordination is achieved by the use of a secondary network (WPAN) protocol that is an overlay protocol that is partially compatible with the WLAN protocol, but not entirely, in terms of power, frame contents and sequences, timing, etc. The secondary network (WPAN) protocols might be 802.11x frames with new frame arrangements adapted for WPAN needs, such as reduced latency, power etc. The computing device might determine to signal the primary network (WLAN) such that devices therein defer so that communications can occur with the secondary network.

In the general example, the computing device is a portable and/or mobile computing and/or communications device with some computing capability. Examples of computing devices include laptop computers, desktop computers, handheld computing devices, pagers, cellular telephones, devices with embedded communications abilities and the like. Examples of peripheral devices include typical computer, telephone etc. accessories where wireless connections are desired, but might also include less common devices, such as wearable devices that communicate with other devices on a person or even to communicate with other nearby devices, possibly using the electrical conductivity of the human body as a data network. For example, two people could exchange information between their wearable computers without wires, by transmission through the air, or using their bodies and/or clothing.

The computing devices may interface to 802.11 WLANs or other wireless networks to communicate with other network nodes, including nodes accessible through wired connections to the wireless network (typically via an access point). The computing devices also may interface to PAN devices over a WPAN, such as wireless headsets, mice, keyboards, accessories, recorders, telephones and the like. A wide variety of PAN devices are contemplated that are adapted for short-range wireless communications, typically bi-directional and typically low power so as to conserve a PAN device's limited power source. Some PAN devices might be unidirectional, either receive-only or transmit-only, devices.

In a typical approach, where a STA needs to connect to more than one wireless network, the STA associates with one wireless network and then when associating with another wireless network, it disassociates with the first wireless network. While this is useful for a WLAN where a STA might move out of one network's range and into the range of another network, this is not desirable when latency needs to be less than an association set-up time. The latency incurred with this switching procedure easily amounts to several hundreds of milliseconds.

In certain applications, it may be desirable for a STA to connect to multiple networks without incurring long switching-induced latencies. For example, consider a typical PER device, that of a cordless mouse. Since update rates for a cordless mouse during normal operation are on the order of 50 to 125 times per second, switching-induced latencies involved with 802.11x association set ups are not acceptable. Furthermore, the switching overhead significantly reduces the STA's usable communication time, defined as the time that the STA is available to transmit or receive data.

In a specific embodiment of the invention, a wireless peripheral like a mouse, is attached to an 802.11x-enabled computing device like a laptop computer, using the 802.11x wireless circuitry inside the laptop, or connected to the laptop via a NIC card. At the same time, the laptop may be connected to the Internet via a regular WLAN network, using the same 802.11x circuitry. Herein, a peripheral or WPAN node will be referred to as "PER". Multiple PERs can connect to a single WPAN. The wireless device coordinating the WPAN is called the coordinator ("COORD"). Where the COORD is also able to connect to the 802.11x network, the COORD is referred to as a "dual-net" device, since it handles both networks. A typical dual-net device in this example is a device that is a STA on an 802.11x network while also having wireless peripherals used by applications running on that device.

While not always required, the PERs are power-sensitive devices. It should be understood that an object labeled "PER"

need not be a peripheral in the sense of an object with a purpose to serve a particular purpose, but rather an object that performs the behaviors herein referred to as behaviors of a WPAN node. For example, a printer can be a PER when it is connected to a desktop computer via a WPAN, but some other device not normally thought of as a peripheral can be a PER if it behaves as one.

Figure 8:
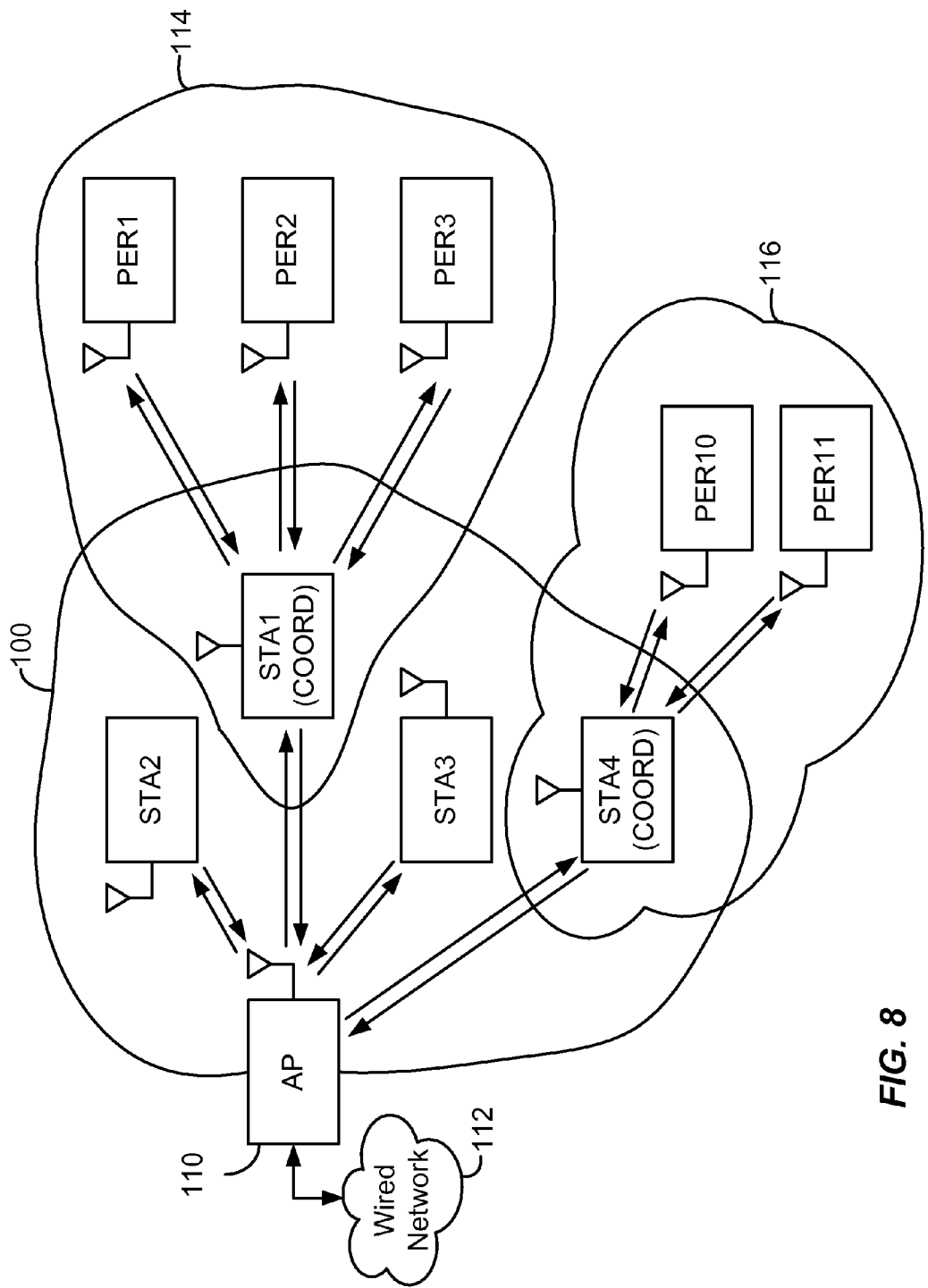
FIG. 8 is a block diagram illustrating various devices operating as part of a primary wireless network ("PWN"), a secondary wireless network ("SWN"), or both, wherein the SWN operates using an SWN protocol that co-exists with the PWN protocol.

FIG. 8 illustrates various devices operating as part of a primary wireless network ("PWN") 100, a secondary wireless network ("SWN") (such as 114 or 116), or both. In the figure, an access point ("AP") 110 supports an infrastructure mode for PWN 100, coupling various stations to the network allowing, for example, network traffic between a station and a wired network 112. By communicating with the AP, a station can retrieve information from the Internet and exchange data with other stations that may or may not be part of the Basic Service Set ("BSS") managed by the AP.

As shown in the example, the stations present are STA1, STA2, STA3 and STA4. Each station is associated with a node in PWN 100 and has the necessary hardware, logic, power, etc. to be a node device in PWN 100. Station STA1 also coordinates SWN 114 as the COORD for that network shown comprising PER1, PER2 and PER3. Likewise, station STA4 coordinates SWN 116 as the COORD for the network comprising STA4, PER10 and PER11. In FIG. 8, each node device is shown with an antenna to indicate that it can communicate wirelessly, but it should be understood that an external antenna is not required.

Other network components and additional instances might also be present. For example, more than one AP might be present, there might be overlaps of BSSes and other network topologies might be used instead of the exact one shown in FIG. 8 without departing from the scope of the invention. Examples used herein for PWN 100 include 802.11x (x=a, b, g, n, etc.), but it should be understood that the primary wireless network may well be another network selected among those in present use or available when the primary wireless network is implemented.

In this example, the secondary wireless networks are assumed to be used for WPAN functionality. The WPAN can be used for, but is not limited to, fixed data rate applications where exchange of data can be scheduled and the amount of data to be exchanged is known and a single dual-net device might interface with multiple PERs. Because the dual-net device may be a regular STA in the first WLAN, it can power-down as needed without problems, unlike an access point. However, since it is also the COORD, peripheral communication could be lost if the peripheral is powered up but the dual-net device/COORD is not. This can be dealt with using mutually agreeable inactivity periods.

Figure 9:
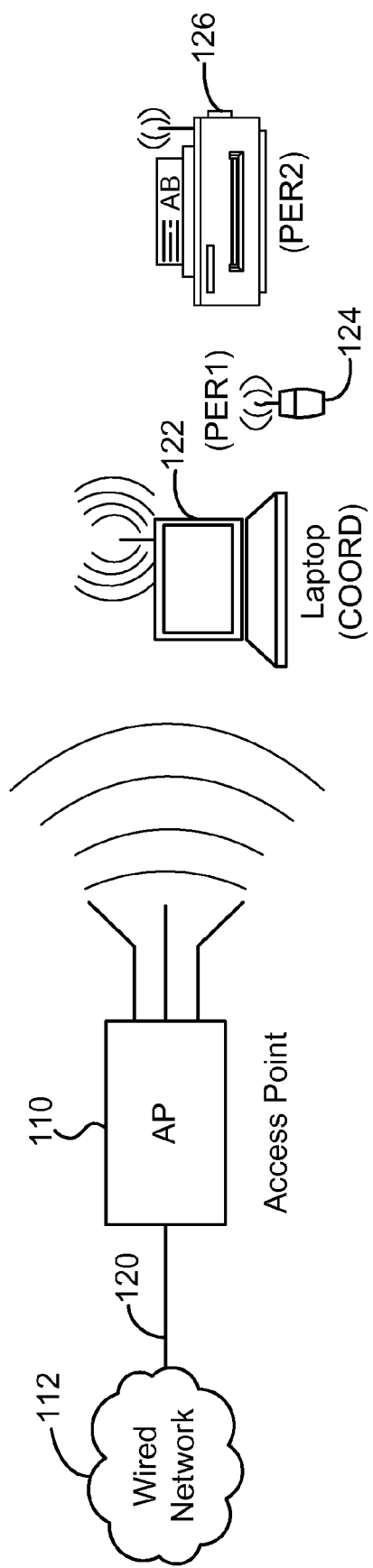
FIG. 9 is a block diagram illustrating a subpart of the elements of FIG. 8, in greater detail.

FIG. 8 shows, at a high level, the interplay among various nodes of various networks. FIG. 9 illustrates a subpart of the elements of FIG. 8, illustrating in greater detail. In this figure, AP 110 is coupled to wired network 112 via cable 120 and might communicate using any suitable wire-based networking protocol. On the other side, AP 110 transmits signals to a station device, in this case a laptop 122, using the AP's antenna and those signals are received by laptop 112 using its antenna. Signals can also flow in the other direction. Such communications would be done according to a PWN protocol, such as an 802.11x protocol.

Laptop 122 (a dual-net device in this example) in turn can communicate with the peripherals shown, in this example a wireless mouse ("PER1") 124 and a wireless printer ("PER2") 126. It may be that power for wireless printer 126 comes from an external power outlet, in which case power consumption might be less of a concern than with mouse 124 if it operates on battery power. Nonetheless, both peripherals might use the same power-saving protocol. Power conservation might also be performed on the dual-net device, for example, when it is a laptop.

To conserve power at the WPAN device and the computing device, they can agree on an inactivity time and disable at least a part of a coordination function of the computing device following a start of the inactivity time, wherein disabling is such that less power per unit time is consumed by the network circuit relative to power consumed when not disabled.

Coordination of Multiple PERs

Figure 10:
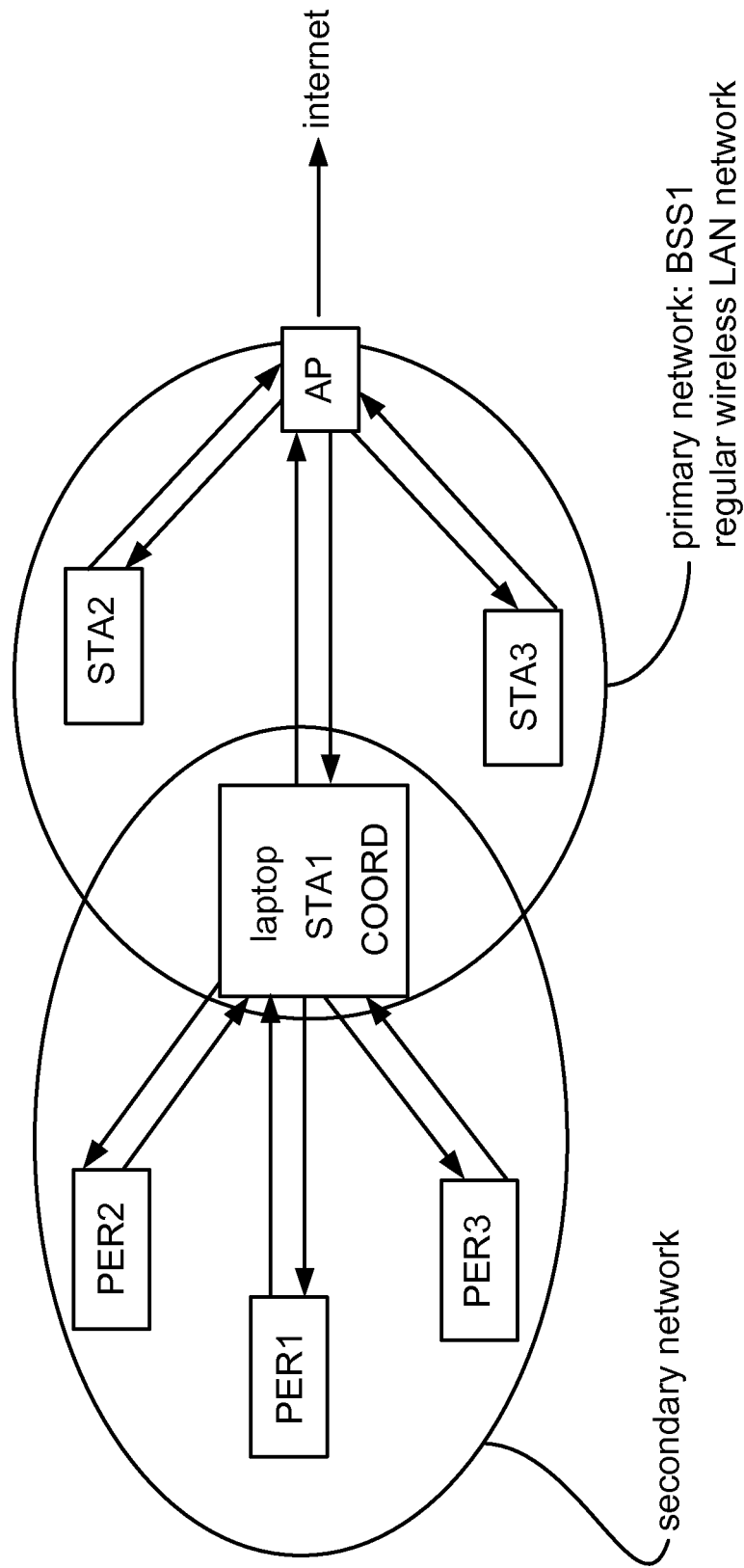
FIG. 10 is a block diagram illustrating a secondary network including multiple WPAN peripherals ("PERs").
Figure 11:
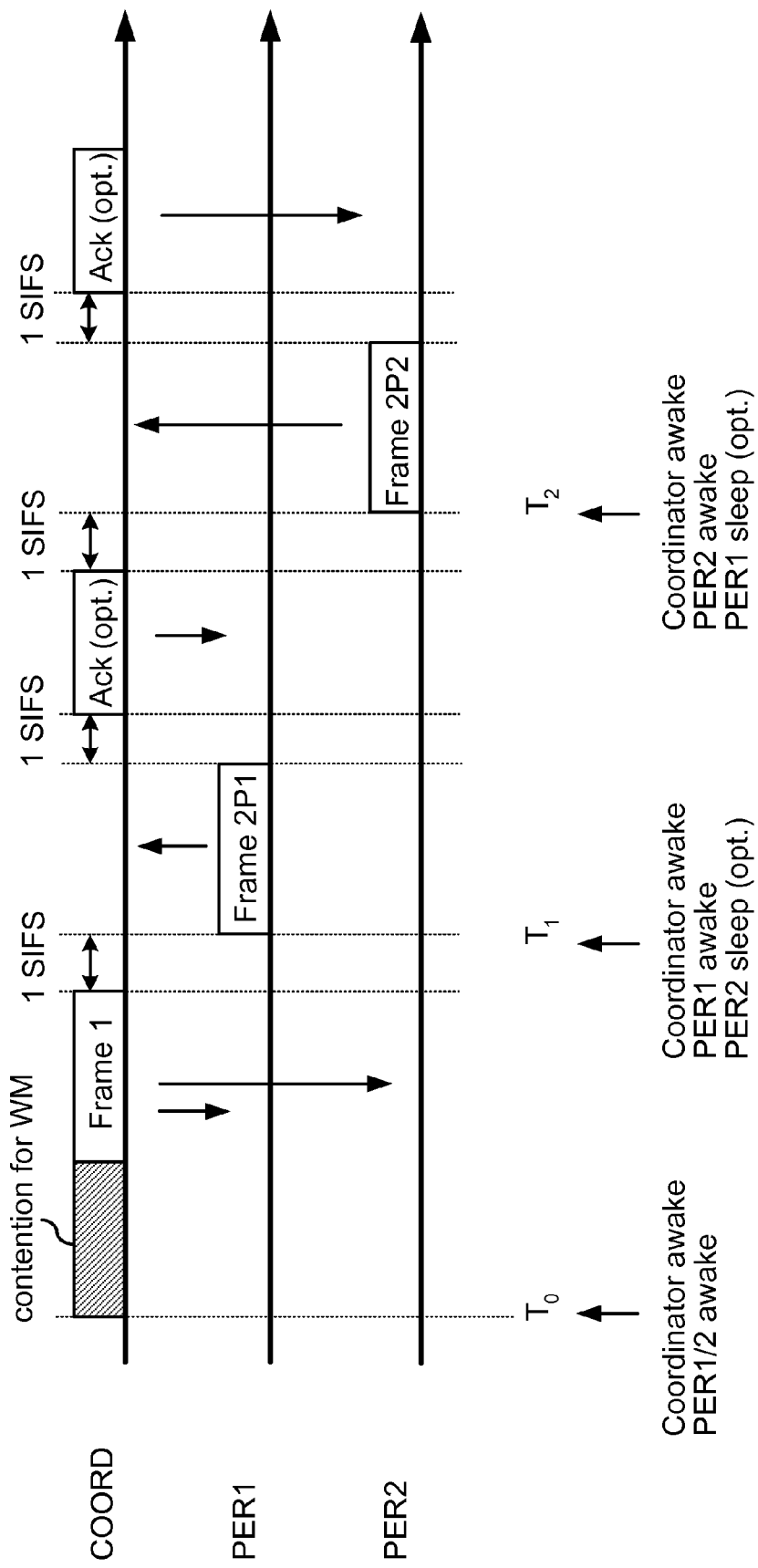
FIG. 11 illustrates method to coordinate the communication between a WPAN coordinator ("COORD") and multiple WPAN peripherals.

When a secondary network includes multiple PERs as illustrated in FIG. 10, it may be desirable to coordinate data exchanges in order to minimize the power dissipation, as well as to minimize the WM occupancy. A method to coordinate the communication between a COORD and multiple PERs is shown in FIG. 11.

At time $T_0$, the COORD and PERs are programmed to start the frame exchange. If power-save modes are implemented in the COORD or the PERs, a wake-up request will be issued prior to $T_0$, to ensure that all necessary circuits are powered up at time $T_0$. At time $T_0$, the COORD contends for the WM and, optionally using the highest priority queue (AC-VO) transmits a first frame, frame 1. The duration field of this frame has been increased to reserve the WM for the subsequent frame transmission by the PERs of the secondary network that are scheduled for a frame exchange during the current frame exchange sequence. The duration field might have been passed during the pairing state, so that the PER and COORD both know and agree on its value.

Furthermore, frame 1 contains a list of PERs it expects to respond, as well as an offset for each scheduled PER. At the specified offset, each PER is awake and responds with a frame containing its data (frame 2P1 and frame 2P2). Optionally, the COORD acknowledges error free reception of the frame, or the COORD can respond with a frame that includes data to be transmitted from the COORD to the frame. Optionally, the PER acknowledges error free reception of the latter frame. Optionally, PERs can return to sleep during the time slots where the COORD is communicating with other PERs.

If one or more of the transmissions were not successful, the COORD may send an additional frame immediately following the above described frame sequence to reserve the medium for additional time to allow for retransmissions. This frame contains the PERs for which retransmission is desirable as well as the corresponding offsets for each PER. PERs that received acknowledgment of their transmission do not have to wake up to listen to this additional frame. In one embodiment, it may be left up to a PER to decide whether it will consider retransmission.

Figure 12:
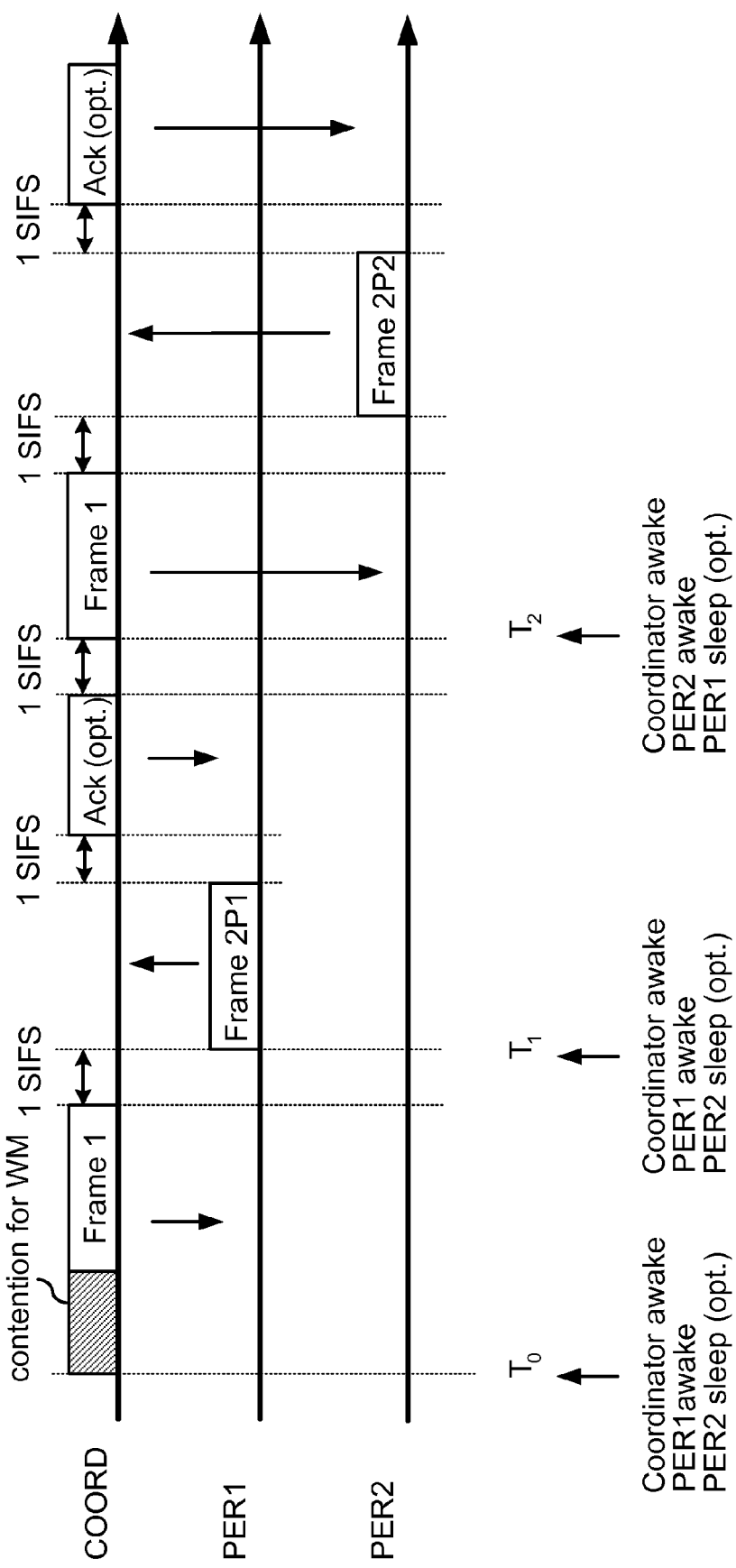
FIG. 12 illustrates an alternative frame exchange sequence for the coordination of multiple WPAN peripherals.

An alternative frame exchange sequence for the coordination of multiple PERs is illustrated in FIG. 12. In this embodiment, the COORD polls each PER individually. At the start of a Service Period ("SP"), the COORD contends for the WM and after gaining access to the WM, the COORD polls the PERs in its secondary network one by one with 1 SIFS space intervals. The latter avoids the situation where the COORD has to contend for the WM for each PER in its secondary network.

To conserve power in the PERs, the expected time for communication with each PER can be pre-calculated based on the number of PERs that are scheduled to be polled prior to the respective PER and their scheduled traffic size.

In case a transmission fails, a retransmission mechanism can be initiated. Alternatively, the COORD may poll the next PER and come back to the failed transmission later, after it has polled all other PERs for which a traffic stream ("TS") has been set up.

Before entering the ACTIVE state, a COORD and PER first go through the PAIRING and CONNECTION states. The first step in establishing a new connection is device PAIRING. Device pairing comprises the first time configuration steps for linking a PER to a COORD.

Device Discovery

During a device discovery procedure, MAC address information is exchanged between the COORD and the PER. A dedicated configuration pushbutton or a simple user action will be used to initiate device discovery. Upon such user intervention, the COORD and PER both enter a "limited discoverable mode" for a certain period of time that is long enough to finish the device discovery procedure. Both COORD and PER can initiate the discovery procedure. The device that initiates the discovery procedure is called the "initiator"; the other device is hereafter referred to as the "follower".

Upon entering discoverable mode, the initiator sends a broadcast discovery request. The broadcast discovery request is a broadcast frame, and may contain information such as the initiator's MAC address, and the type of devices that should respond. A follower in discoverable mode responds to a broadcast discovery request with a discovery response. The discovery response frame is a unicast frame that is addressed to the initiator.

For security reasons, it is advisable that the amount of information exchanged while in discoverable mode is minimized. However, if appropriate, additional information can be exchanged during the device discovery procedure. For example, if generated by the COORD, the broadcast discovery frame may optionally contain information on the WLAN connectivity status (infrastructure/ad-hoc/unconnected, operating channel, power-save, etc.). If generated by the PER, the broadcast discovery frame may optionally contain information about the type of PER.

In one embodiment, the COORD acts as the initiator and sends an IEEE802.11 probe request frame. The SSID parameter of the broadcast probe request frame may be used to communicate specific information to the PER, in this case the follower. More specifically, the SSID field in the frame body can be used as a frame type identifier and to send additional information to a follower. For example, specific bits of the SSID can be used to identify the over-the-air protocol. Other bits of the SSID can be reserved to identify the frame as a broadcast discovery request frame. The remainder of the bits can be reserved or used to communicate additional information about the COORD or the WLAN it is associated with to the PER (follower).

In another embodiment, a data frame or standard or proprietary IBSS beacon frame or other management frame is used as a broadcast discovery request frame.

Upon receiving the broadcast device discovery request frame, the PER in discoverable mode (the follower) responds by sending a unicast discovery response frame. This can be a unicast IEEE802.11 probe response frame. The probe response frame is addressed to the initiator, and structured such that it is recognized as a discovery response frame by the initiator. Alternatively, the discovery response frame can be a data frame formatted to be recognized by the COORD as a discovery response frame.

A device discovery channel can be pre-defined in the protocol. In that case, an initiator put into discoverable mode will, by default, start sending broadcast discovery requests on the pre-defined channel, and a follower put in discoverable mode will, by default, listen for a broadcast discovery request on the pre-defined channel.

When device discovery is initiated, and no device discovery channel is pre-defined, the initiator and follower may need to search for each other. Either the initiator or the follower may perform this search. If the initiator performs the search, the follower listens on a fixed channel, while the initiator scans different channels, by subsequently transmitting broadcast discovery request frames on different channels. Alternatively, when the follower performs the search, the initiator transmits broadcast discovery request frames on a fixed channel at $T_{discovery}$ time intervals, while the follower performs a passive scan by listening for a broadcast discovery request on different channels. Note that the follower should stay on a single channel for at least $T_{discovery}$ to ensure it will capture a broadcast discovery frame.

At the conclusion of the device discovery procedure, at a minimum, the initiator and follower have knowledge of each other's MAC address and current operating channel of the COORD's primary network.

Variations

Other variations should be apparent upon review of this disclosure.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A network-enabled hub, usable for facilitating data communications between two or more wireless devices that are configured to communicate indirectly with each other via the network-enabled hub, comprising:
   an interface to a wireless radio circuit that can send and receive data wirelessly, providing the hub with bi-directional wireless data communication capability;
   a processor configured to:
   process data received via the wireless radio circuit;
   generate data to be transmitted by the wireless radio circuit;
   initiate and maintain network connections with nodes of a wireless network external to the network-enabled hub, maintaining at least a first network connection using a first network protocol and a second network connection using a second network protocol, that can be maintained, at times, simultaneously with each other, wherein the second network protocol is an overlay protocol with respect to the first network protocol in that communications using the second network protocol are partially consistent with the first network protocol and wherein at least some of the communications using the second network protocol impinge on at least some antennae used for communications using the first network protocol; and
   implement data forwarding logic, implemented in a network-enabled hub using hardware and/or software, that forwards data between an originating node and a destination node, wherein the originating node is a node in one of the first and second networks and the destination node is a node in the other of the first and second networks.

2. The network-enabled hub of claim 1, further comprising a routing module for receiving a poll request that contains information required to unambiguously identify a station that is a node in the second network, wherein the routing module coordinates retrieval of information from the station.

3. The network-enabled hub of claim 1, wherein the first network connection provides a link via an access point of a wireless LAN and the second network connection provides a link to a personal area network ("PAN") serving PAN devices, such that network nodes that have access to the wireless LAN can address packets to PAN devices that are nodes on the PAN.

4. The network-enabled hub of claim 3, wherein the network-enabled hub is configured to accept packets from the PAN devices where the packets are addressed to network devices that are accessible only via the network-enabled hub.

5. The network-enabled hub of claim 3, further comprising:
at least one software module forming a software platform that allows the wireless radio circuit to connect to both the wireless LAN and the PAN; and
an operating system that enables operation of the network-enabled hub and execution of user-written application-specific application software for the network-enabled hub.

6. The network-enabled hub of claim 1, wherein the second network protocol is a protocol that requires lower average power consumption over time relative to the first network protocol.

7. The network-enabled hub of claim 1, wherein the first network protocol is an 802.11x wireless protocol and the second network protocol is a modification of the 802.11x wireless protocol that is not entirely compliant with the 802.11x wireless protocol of the first network but can be maintained in a common wireless space as the 802.11x wireless protocol.

8. The network-enabled hub of claim 7, wherein the second network protocol is a protocol that allows for the network-enabled hub and the node in the second network to maintain the second network connection during a mutually agreeable inactivity period during which one or both of the network-enabled hub and the node is configurable such that it can enter an inactivity period wherein at least some communication function is disabled such that less power per unit time is consumed to power consumed when the communication function is not disabled.

9. The network-enabled hub of claim 1, wherein the network-enabled hub and a device at the node in the second network other than network-enabled hub are configured to support a discovery mode using the second network, wherein the network-enabled hub and the device include logic, in one or both of the network-enabled hub and the device, for initiating device discovery by sending broadcast discovery requests on a pre-defined channel, further wherein both the network-enabled hub and the device are configured to have knowledge of a definition of the pre-defined channel, known prior to initiation of discovery.

10. The network-enabled hub of claim 9, wherein the network-enabled hub and the device further include logic, in one or both of the network-enabled hub and the device, for indicating characteristics and/or state of the network-enabled hub and/or device.

11. The network-enabled hub of claim 1, wherein the network-enabled hub includes logic to coordinate a mutually agreeable inactivity period between the network-enabled hub and wireless personal area network ("WPAN") devices such that the WPAN devices can enter a sleep mode and occasionally wake up to transmit or receive data and/or control signals, with the network-enabled hub and WPAN devices synchronized so that the network-enabled hub is able to communicate with WPAN devices when WPAN devices wake up.

12. The network-enabled hub of claim 11, wherein the network-enabled hub is configured to sleep for at least a portion of the mutually agreeable inactivity period.

13. The network-enabled hub of claim 1, further comprising the wireless radio circuit interfaced to the logic for processing data, wherein the wireless radio circuit supports communications on both the first network and the second network.

14. The network-enabled hub of claim 1, further comprising a housing into which electronic components can be housed internally.

15. The network-enabled hub of claim 1, further comprising a power module that receives power from an integrated wall plug.

16. The network-enabled hub of claim 1, wherein the network-enabled hub is embedded into a personal computer, a cellular phone, or home entertainment equipment.

17. The network-enabled hub of claim 1, wherein a device that is a node of the second network is one of a wireless mouse, wireless keyboard, wireless headset, personal digital assistant ("PDA"), or portable printer.

18. The network-enabled hub of claim 17, further comprising a power module that receives power from an integrated wall plug.

19. A computing device having therein a network-enabled hub, comprising hardware and software, usable for facilitating data communications between two or more wireless devices that are configured to communicate indirectly with each other via the network-enabled hub, comprising:
a wireless radio circuit that can send and receive data wirelessly, providing the hub with bi-directional wireless data communication capability, the radio circuit configured to handle 802.11x packet transmissions, and wherein the wireless radio circuit supports communications on both a wireless local area network ("WLAN") and wireless personal area network ("WPAN");
a processor configured to:
process data received via the wireless radio circuit;
generate data to be transmitted by the wireless radio circuit;
initiate and maintain network connections with nodes of the WLAN and WPAN external to the network-enabled hub, maintaining at least a first network connection using a first network protocol, of the WLAN, and a second network connection using a second network protocol, of the WPAN, that can be maintained, at times, simultaneously with each other, wherein the second network protocol is an overlay protocol with respect to the first network protocol in that communications using the second network protocol are partially consistent, but not entirely consistent, with the first network protocol, and wherein the first network protocol is an 802.11x wireless protocol and the second network protocol is a modification of the 802.11x wireless protocol that is not entirely compliant with the 802.11x wireless protocol of the first network but can be maintained in a common wireless space as the 802.11x wireless protocol, and wherein at least some of the communications using the second network protocol impinge on at least some antennae used for communications using the first network protocol;

implement logic for data forwarding between an originating node that is a node in of one of the first and second networks and a destination node that is a node in of the other of the first and second networks, the logic for data forwarding including logic for processing a data packet from the originating node to identify an address of the destination node in the data packet and using that address to transmit data into the second network;

a routing module for receiving a poll request that contains information required to unambiguously identify a station that is a node in the second network, wherein the routing module coordinates retrieval of information from the station;

at least one software module forming a software platform that allows the wireless radio circuit to connect to both the WLAN and the WPAN; and an operating system that enables operation of the network-enabled hub and execution of user-written application-specific application software for the network-enabled hub.

20. The computing device of claim 19, wherein the network-enabled hub includes logic to coordinate a mutually agreeable inactivity period between the network-enabled hub and WPAN devices such that the WPAN devices can enter a sleep mode and occasionally wake up to transmit or receive data and/or control signals, with the network-enabled hub and WPAN devices synchronized so that the network-enabled hub is able to communicate with WPAN devices when WPAN devices wake up, and wherein the network-enabled hub is configured to sleep for at least a portion of the mutually agreeable inactivity period, while maintaining connections between the network-enabled hub and the WPAN devices and between the network-enabled hub and an access point.

* * * * *